(12) United States Patent
Tovey et al.

(10) Patent No.: US 12,062,010 B2
(45) Date of Patent: Aug. 13, 2024

(54) CHECK-IN SYSTEMS AND METHODS FOR AN AUTOMATED TOWER THAT STORES AND DISPENSES CUSTOMER ORDERS

(71) Applicant: Walmart Apollo, LLC, Bentonville, AR (US)

(72) Inventors: David G. Tovey, Rogers, AR (US); Bruce Wilkinson, Rogers, AR (US); John Simon, Pembroke Pines, FL (US); Kurt William Robert Bessel, Mexico, NY (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 18/189,353

(22) Filed: Mar. 24, 2023

(65) Prior Publication Data
US 2023/0230026 A1 Jul. 20, 2023

Related U.S. Application Data

(63) Continuation of application No. 16/391,615, filed on Apr. 23, 2019, now abandoned.
(Continued)

(51) Int. Cl.
*G06Q 10/0836* (2023.01)
*G06F 16/9537* (2019.01)
(Continued)

(52) U.S. Cl.
CPC ..... *G06Q 10/0836* (2013.01); *G06F 16/9537* (2019.01); *G06Q 10/0832* (2013.01);
(Continued)

(58) Field of Classification Search
CPC ............ G06Q 10/083; G06Q 10/0832; G06Q 10/0833; G06Q 10/0835; G06Q 10/0837; G06Q 10/0838
See application file for complete search history.

(56) References Cited

U.S. PATENT DOCUMENTS 6,536,189 B1 3/2003 Murray
7,974,873 B2 7/2011 Simmons et al.
(Continued)

OTHER PUBLICATIONS

Business Insider ("Walmart built a giant vending machine that retrieves groceries"; available at: https://Avww.businessinsider.com/walmart-built-a-giant-vending-machine-that-retrieves-groceries-2017-6, last accessed Apr. 9, 2024) (Year: 2017).*
(Continued)

*Primary Examiner* — Emmett K. Walsh
(74) *Attorney, Agent, or Firm* — Morgan, Lewis & Bockius LLP; Manita Rawat

(57) ABSTRACT

A check-in system for an dispensing items includes a computing device having an application installed thereon. The computing device is configured to check in a customer to notify the kiosk of a time range during which an order of the customer is picked up. The kiosk is configured to receive a check-in message from the computing device, receive the location of the computing device, receive a message indicative of the arrival of the customer at the automated tower, retrieve information of the order from an order database stored on a remote server, assemble the order based on the check-in message and the information of the order, and move the assembled order close to a pick-up location of the automated tower to facilitate pick-up of the assembled order.

20 Claims, 6 Drawing Sheets

Related U.S. Application Data

(60) Provisional application No. 62/661,123, filed on Apr. 23, 2018.

(51) Int. Cl.
  *G06Q 10/083*  (2023.01)
  *G06Q 10/0832*  (2023.01)
  *G06Q 10/0833*  (2023.01)
  *G06Q 10/0835*  (2023.01)
  *H04W 4/021*  (2018.01)

(52) U.S. Cl.
  CPC ... *G06Q 10/0833* (2013.01); *G06Q 10/08355* (2013.01); *G06Q 10/0838* (2013.01); *H04W 4/021* (2013.01)

(56) References Cited

U.S. PATENT DOCUMENTS

| | | | |
|---|---|---|---|
| 9,242,810 | B2 | 1/2016 | Lossov et al. |
| 9,604,259 | B2 | 3/2017 | Lossov et al. |
| 9,710,848 | B2 | 7/2017 | Napper |
| 10,357,804 | B2 | 7/2019 | Must et al. |
| 10,621,401 | B2 | 4/2020 | Lossov et al. |
| 2004/0177008 | A1 | 9/2004 | Yang |
| 2004/0236635 | A1* | 11/2004 | Publicover ......... G06Q 10/0832 705/26.81 |
| 2008/0065506 | A1 | 3/2008 | Shillington |
| 2008/0082424 | A1 | 4/2008 | Walton |
| 2013/0198042 | A1 | 8/2013 | Seifen |
| 2014/0074743 | A1 | 3/2014 | Rademaker |
| 2014/0279270 | A1 | 9/2014 | Bertanzetti et al. |
| 2015/0186840 | A1* | 7/2015 | Torres ................. A47F 10/02 705/339 |
| 2015/0291357 | A1 | 10/2015 | Razumov |
| 2016/0063604 | A1 | 3/2016 | Shaffer et al. |
| 2016/0350837 | A1 | 12/2016 | Williams et al. |
| 2016/0364670 | A1* | 12/2016 | Lin ................ G06Q 10/06316 |
| 2017/0011319 | A1* | 1/2017 | Elliot ................. G06Q 30/06 |
| 2017/0053099 | A1 | 2/2017 | Coughlin et al. |
| 2017/0124670 | A1 | 5/2017 | Becker et al. |
| 2017/0200218 | A1* | 7/2017 | Napper .................. G06Q 50/12 |
| 2018/0005185 | A1* | 1/2018 | Elazary .............. G06Q 10/0832 |

OTHER PUBLICATIONS

International Search Report and Written Opinion mailed Jul. 17, 2019, in corresponding International Application No. PCT/US2019/028709, 14 pages.

Cleveron AS, Pack Robot Cleveron 401, still image at 0:58 of the video published Sep. 15, 2015, 1 page, retrieved from the Internet, URL:https://www.youtube.com/watch?v=- iyT2hGrF0c&Feature=youtu.be [retrieved on Apr. 21, 2020].

Cleveron AS, Pack Robot Cleveron 401, still image at 0:13 of the video published Sep. 15, 2015, 1 page, retrieved from the Internet, URL:https://www.youtube.com/watch?v =-iyT2hGrF0c&feature=youtu.be [retrieved on Apr. 21, 2020].

Cleveron AS, Parcel Locker Cleveron 301, still image at 0:21 of the video published on Mar. 29, 2018, 1 page, retrieved from the Internet, URL:https://www.youtube.com/watch?v=JOjgAvQ8h1A&feature=youtu.be [retrieved on Apr. 21, 2020].

Cleveron AS, Parcel Locker Cleveron 301, still image at 0:23 of the video published on Mar. 29, 2018, 1 page, retrieved from the Internet, URL:https://www.youtube.com/watch?v=JOjgAvQ8h1A&feature=youtu.be [retrieved on Apr. 21, 2020].

Cleveron AS, Parcel Locker Cleveron 301, still image at 0:30 of the video published on Mar. 29, 2018, 1 page, retrieved from the Internet, URL:https://www.youtube.com/watch?v=JOjgAvQ8h1A&feature=youtu.be [retrieved on Apr. 21, 2020].

Walmart, Walmart's new Cleveron Pickup machine in action, still image at 0:51 of the video published Dec. 21, 2017, 1 page retrieved from the Internet, URL:https://www.youtube.com/watch/v=c6amWJISqH0 [retrieved on Apr. 24, 2020].

Business Insider ("Walmart built a giant vending machine that retrieves groceries;" available at https://businessinsider.com/walmart-built-a-giant-vending-machine-that-retrieves-groceries-2017-6, last accessed Jan. 10, 2022) (Year: 2017).

First Examination Report for GB Patent Application No. 2018107.9 issued Feb. 21, 2022.

Second Examination Report for GB Patent Application No. 2018107.9 issued Jun. 8, 2022.

* cited by examiner

CHECK-IN SYSTEMS AND METHODS FOR AN AUTOMATED TOWER THAT STORES AND DISPENSES CUSTOMER ORDERS

CROSS REFERENCE TO RELATED APPLICATIONS

This application is a continuation of U.S. patent application Ser. No. 16/391,615, filed on Apr. 23, 2019, which claims the benefit of U.S. Provisional Application No. 62/661,123, filed on Apr. 23, 2018, content of each of which is incorporated by reference herein in its entirety.

BACKGROUND

1. Technical Field

The present disclosure relates to an automated tower that stores and dispenses customer orders. More specifically, the present disclosure relates to check-in systems and methods for an automated tower that stores and dispenses customer orders.

2. Introduction

An automated tower or kiosk that receives, stores, and dispenses customer orders, may be deployed at a desired location, by a retailer. As used herein, the "tower" and "kiosk" are interchangeable. Customers' orders may be loaded into the tower by store associates, carriers, and received into the tower via deliveries by unmanned vehicles or drones. However, existing towers may have some disadvantages. For example, package size of customer orders is significantly restricted; capacity of a tower is fixed and not adjustable as desired; tower security may be insufficient; natural disaster tolerance is little considered for a tower; and a check-in feature that allows a tower to prepare customer orders in advance for quick pick-up is not integrated.

What is provided herein are check-in systems and methods for an automated tower that stores and dispenses customer orders, which may overcome some aspects of disadvantages of an existing tower.

SUMMARY

Disclosed herein are check-in systems for an automated tower for dispensing a customer's order. The system comprises a computing device having an application installed thereon. The computing device is configured to: check in, via the application, a customer with the automated tower to notify the automated tower of a time range during which an order of the customer is to be picked up; communicate, via the application, a location of the computing device to the automated tower; and inform, via the application, the automated tower when the customer arrives at the automated tower. The system also comprises the automated tower including a central computer in communication with the computing device. The automated tower is configured to: receive, via the central computer, a check-in message of the customer from the computing device; receive, via the central computer, the location of the computing device; receive, via the central computer, a message indicative of the arrival of the customer at the automated tower, from the computing device; retrieve, via the central computer, information of the order from an order database stored on a server; assemble the order based on the check-in message and the information of the order; and move the assembled order to a pick-up location of the automated tower to facilitate pick-up of the assembled order. The system further comprises the remote server in communication with the central computer. The remote server is configured to: store the information of the order in the order database; and send the information of the order to the central computer.

Disclosed herein is also a check-in method for an automated tower for dispensing a customer's order. The check-in method comprises receiving a check-in message indicative of a time range during which an order of a customer is to be picked up; retrieving information of the order from an order database stored on a server; assembling the order based on the check-in message and the information of the order; and moving the assembled order to a pick-up location of the automated tower to facilitate pick-up of the assembled order.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Embodiments of this disclosure are illustrated by way of an example and not limited in the figures of the accompanying drawings, in which like references indicate similar elements and in which.

DETAILED DESCRIPTION

Figure 1:
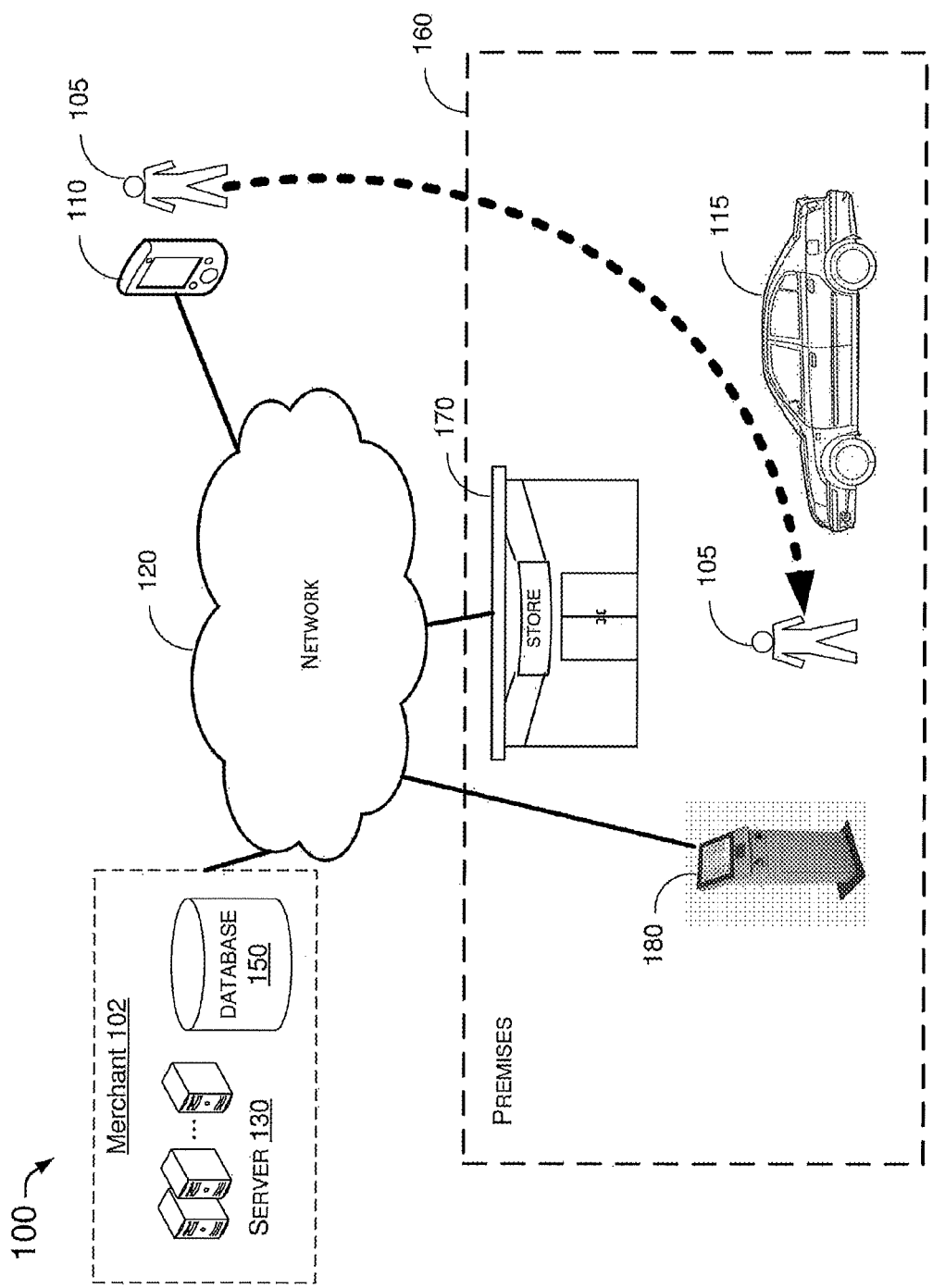
FIG. 1 is a diagram depicting an example computing environment in which example embodiments of the present disclosure may be implemented.

Various configurations and embodiments of the disclosure are described in detail below. While specific implementations are described, it should be understood that this is done for illustration purposes only. Other components and configurations may be used without parting from the spirit and scope of the disclosure.

In this disclosure, check-in systems and methods may be integrated with an automated tower for facilitating dispensing and picking up of customers' orders. The check-in system disclosed herein may also be implemented in a retail store or a locker. With the check-in system integrated, the automated tower may assemble a customer's order in advance for pick-up. The order may include items that are stored at different locations inside the tower, or within the store, for example, hot items, cold items, etc. The order may be prepared in view of a "check-in" by the customer. The check-in on the part of the customer can be used to prepare the order for a tower pickup. The order information may be retrieved by the tower system, for example, from a remote server, and used to assemble the order. The tower system may move an already assembled order close to a pick-up location (e.g., a pick-up window) to facilitate pick-up. This process may be valuable in applications where the tower has to perform some time-consuming task, such as retrieving products from cold storage, binning, etc. in order to prepare the order for pick-up at the tower. The check-in system may also be of value if there is a queue of customers waiting to pick up orders. Check-in can allow the customer to reserve or confirm a designated pick-up time.

An example check-in may include the following. A customer can check-in using an app or website, which can communicate to a tower application, for example, an application installed on a remote central computer of the tower. The customer may actively "click" check-in. When the tower receives the check-in message or the customer crosses a specified geofence, the tower system may begin assembling the customer's order or staging an assembled order. The order information (e.g., customer name and address, the numbers and names of items of the order, order number, payment method, order date and time, etc.) may be stored on an order database on a server. The tower system can retrieve, via the computer, the order information from the order database and determine the locations of the items in the order, for example, by interfacing with an inventory system, and assemble the order. When the customer arrives, and indicates their presence at the tower or store, the order is ready for pick-up.

In some embodiments, the check-in system may pre-generate a check-in time based on a number of factors, as soon as the order is received at the tower. This check-in time may be an estimate of when the customer will arrive to pick up the order, and may be a function of customer location, road traffic, customer history of order placement-to-pickup time, etc. This pre-generated time may allow the tower to take some actions to prepare the order, as long as these actions do not interfere with confirmed check-ins. For example, the tower system may start moving a pre-checked order closer to the pick-up window if there is adequate space and it does not take necessary space from an order that has been confirmed as checked-in.

In some embodiments, the check-in system may consider one or more of temperatures of hot and cold items, a pre-generated or confirmed pickup time of the items, a standard pickup time of the items to assemble the order of the items, such that the items are still hot or cold for pick-up. For example, changes in temperature for items in an order based on elapsed time may be determined. Ice cream stored at its freezing point may be determined to stay above an acceptable temperature for 10 minutes when moved from hot storage. The system may only move the item from hot storage within the acceptable time frame.

Towers may be deployed in remote locations, inside retail stores, outside of stores, or other locations. Towers may also be deployed in clusters, for example, to form a multiple-tower system in which towers can be connected both physically and electronically, with products and orders moved dynamically between towers.

In some embodiments, the check-in system may be entirely or partially deactivated, and updated based on a security system. For example, the check-in system may not be available for customers to check in when one or more events are detected by the security system, such as flooding or fire. Based on events that are detected by the security system, the check-in system may send customers alert or update messages regarding the status of the order, such as "the tower is temporarily closed due to heavy rain," "your order will be delayed for pick-up," "please pick up your order prior to 3:00 pm after which the tower will be closed due to expected maintenance resulting from a power outage," "sorry, your order has been delayed and will be ready for pick-up in 3 days," and so forth.

FIG. 1 is a diagram depicting an example computing environment 100 in which example embodiments may be implemented. In example computing environment 100, a merchant 102 operates a number of physical stores (including a physical store 170) to sell products and services. The merchant 102 may also allow online shopping of its products and services by online shoppers (herein interchangeably referred to as users), e.g., a user 105 using a user device 110, at an e-commerce website hosted on a web server via a network 120.

Example computing environment 100 may also include a server 130 in which embodiments of the present disclosure are implemented. That is, server 130 may be configured to allow users, e.g., user 105, to place a new order of one or more items or to add one or more items to a pre-existing online order before picking up the online order at a physical store, e.g., physical store 170. Server 130 may be communicatively connected to a database 150 via network 120 or a local area network.

In some embodiments, database 150 may be an integral part of server 130. Database 150 may record, store or otherwise contain therein data associated with a set of products and services that are available for sale at the e-commerce website, which is hosted on web server for pickup at one or more physical stores associated with merchant 102, including physical store 170. Database 150 may also record, store or otherwise contain therein data associated with a set of products and services that are available for sale at physical store 170.

Physical store 170 may be located at a location or premises 160 operated by, rented by, owned by or otherwise associated with merchant 102. As shown in FIG. 1, within premises 160 there is a kiosk 180. In some embodiments, kiosk 180 may be operated by or otherwise associated with merchant 102, and may be in a close proximity of physical store 170. Physical store 170 may include one or more computing devices (not shown) that are communicatively connected to network 120. User device 110, server 130, the one or more computing devices at physical store 170 and kiosk 180 may be communicatively connected to each other via network 120.

When user 105 places an online order, e.g., via user device 110, for one or more items at the e-commerce website of merchant 102, user 105 may select a kiosk, among a plurality of kiosks 180 associated with merchant 102, as the desired kiosk where user 105 plans to pick up the one or more items of the online order. The website may also request user 105 to enter a date and a time of the day as an estimated date and time for pick-up of the one or more items of the online order. Also, as noted above, user 105 may be assigned a pick-up time.

In some embodiments, server 130 may receive geographic information about user 105. For example, server 130 may receive the geographic information by utilizing a Global Positioning system (GPS) on user device 110. The geographic information may indicate that user 105 is within a predetermined area associated with physical store 170. The predetermined area may be determined based on a location of premises 160 or kiosk 180. For example, the predetermined area may include premises 160. Server 130 may then determine whether there is a pending order for a user account associated with user 105 in database 150.

If there is a pending order for the user account, server 130 may transmit order information for the pending order to a local computing device of kiosk 180. For example, the local computing device may include a computing device configured to facilitate packaging and delivering ordered one or more items.

If there is not a pending order for the user account, server 130 may transmit advertisement information to user device 110. For example, server 130 may determine the advertisement information based on user data associated with user 105 and current promotion information associated with physical store 170.

Figure 2:
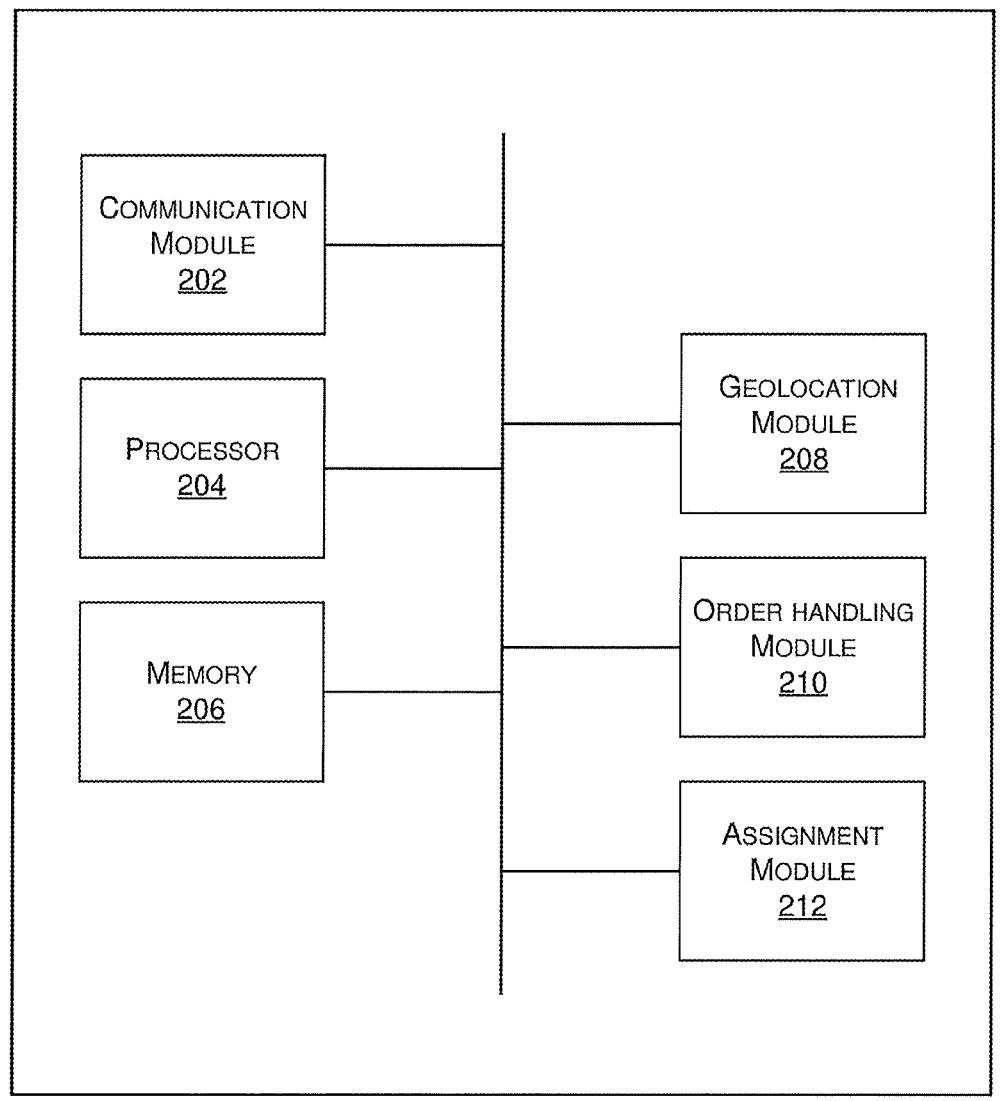
FIG. 2 is a block diagram depicting an embodiment of a server configured to fulfill a remotely placed order in accordance with the present disclosure.

FIG. 2 is a block diagram depicting an embodiment of a server 200 configured to implement example embodiments for fulfilling existing orders in accordance with the present disclosure. Server 200 may perform various functions related to embodiments of the present disclosure. In some embodiments, server 200 may be implemented in or as server 130 of FIG. 1. In some embodiments, server 200 may be implemented as one or more computing devices that cooperatively implement the functions described herein. Server 200 may include a communication module 202, one or more processors (shown as a processor 204 in FIG. 2), and a memory 206. Communication module 202 may allow server 200 to communicate with other networks, systems, servers, computing devices, etc. Processor 204 may execute one or more sets of instructions to implement the functionality provided by server 200. Memory 206 may store the one or more sets of instructions executable by processor 204 as well as other data used by processor 204.

Server 200 may also include a geolocation module 208, an order handling module 210, and an assignment module 212. Each of geolocation module 208, order handling module 210, and assignment module 212 may perform one or more functions under the control of processor 204. Although geolocation module 208, order handling module 210, and assignment module 212 are depicted in FIG. 2 as discrete modules separate from the processor 204, in various implementations one or more of geolocation module 208, order handling module 210, and assignment module 212 may be an integral part of processor 204. For simplicity, a task or function performed by any of geolocation module 208, order handling module 210, and assignment module 212 may be described as if such task or function is performed by processor 204.

Geolocation module 208 may be configured to receive geographic information about user 105. Geographic information may refer to user information and behavior that are related to a geographic location of user 105. Geographic location may refer to a relative location (e.g., Seattle, 1313 Disneyland Dr., Anaheim, CA 92802, etc.) as a distance for another site. Geographic location may also refer an absolute location using a coordinate system (e.g., a Spherical coordinate system or a world Geodetic system).

In some embodiments, geolocation module 208 may determine, based on the geographic information, that user 105 is within a predetermined area associated with physical store 170. In some instances, the predetermined area may be determined based on a location of premises 160 or a location of physical store 170. For example, the predetermined area may include premises 160.

In some embodiments, geolocation module 208 may obtain the geographic information in various methods. User 105 may provide the geographic information using user device 110. For example, user 105 may install an application on user device 110. The application may monitor user behavior and collect geographic information by utilizing a GPS on user device 110. With the consent of user 105, the application may transmit the collected geographic information to server 130.

Order handling module 210 may be configured to determine whether there is a pending order for a user account associated with user 105 in database 150 after geolocation module 208 determines that user 105 is within the predetermined area. In these instances, order handling module 210 may transmit order information of the pending order to a local computing device of kiosk 180.

The order information may include one or more items in the pending order. In some embodiments, the order information may further include at least one of: a pick-up time slot of the pending order, a customer order serial number (OSM) of the pending order, or a user identifier (ID) of user 105. The order information may further include user data associated with user 105.

User data may include a collection of records of user information and behavior that is, for example, associated with online or offline transaction. The user data may be obtained from store receipts, credit card purchases, mail-order requests, information inquiries, browsers, cookies, and other sources related to customer preferences or predisposition to purchasing or using an item. User online data may refer to a collection of records of user online behavior related to, for example, user online preferences or predisposition to purchasing or using an item.

User preference data may include choices that user 105 has made with respect to interests (e.g., highly likes, partially likes, dislikes, etc.) of user 105. For example, the user preference data may include implicit and explicit information about user 105, the extent to which user 105 likes or dislikes one or more items.

The implicit and explicit information may be extracted from the user interaction with the system. For example, explicit information may be in form of ratings associated with the item, and implicit information may be generated by interpreting the user interaction data. For example, an online retailer website may infer that user 105 likes a product if user 105 stays with the item page more than a predetermined time period. For example, user preference data may further include an acceptable substitution of the one or more items and an unacceptable substitution of the one or more items. In some embodiments, the profile database may contain a collection of organized user preference data for multiple users or one or more categories of users.

After receiving the order information, kiosk 180 may start to pre-pick one or more items in the pending order. Order handling module 210 may transmit a message to user device 110 to notify user 105 of a pick-up time of the pending order.

In some embodiments, kiosk 180 may determine that an item of the one or more items is not in stock. In these instances, order handling module 210 may determine a substitute of the item based on the user preference data of user 105.

In some embodiments, order handling module 210 may receive a message indicating that an item of the one or more items is rejected or returned by user 105. In these instances, order handling module 210 may recalculate billing information of the pending order, and transmit the recalculated billing information to user device 110.

In some embodiments, order handling module 210 may determine that there is not a pending order for user 105. In these instances, order handling module 210 may further determine advertisement information of physical store 170 based on user data associated with user 105, and transmit the advertisement information to user device 110.

Figure 3:
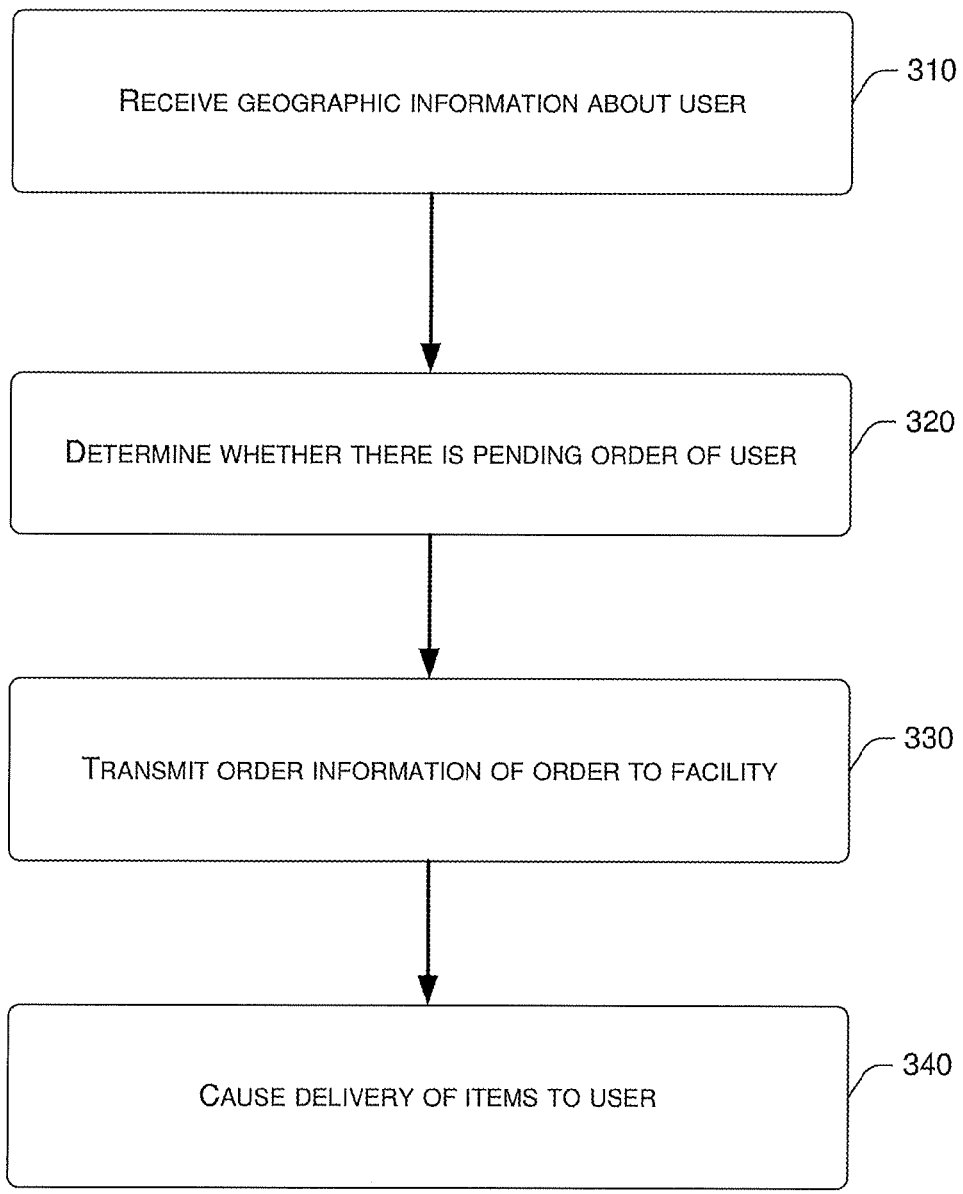
FIG. 3 is a flowchart diagram of an example process for fulfilling a remotely placed order in accordance with the present disclosure.

FIG. 3 is a flowchart diagram of an example process 300 for fulfilling a remotely placed order. Example process 300 may include one or more operations, actions, or functions such as 310, 320, 330 and 340. Although illustrated as discrete blocks, various blocks may be divided into additional blocks, combined into fewer blocks, or eliminated, depending on the desired implementation. Example process 300 may be implemented by one or more processors including, for example, one or more processors of server 130 and server 200. For illustrative purposes, the operations described below are performed by one or more processors of server 130 and processor 204 of server 200. Each of server 130 and server 200 may be referred to as a computing device herein.

At 310, one or more processors of server 130 or server 200 may receive geographic information about user 105. For example, the geographic information may indicate that user 105 is within a predetermined area associated with physical store 170. The geographic information may be obtained by utilizing a GPS on user device 110 of user 105 or a sensor associated with kiosk 180 in premises 160.

At 320, the one or more processors of server 130 or server 200 may determine whether there is a pending remotely placed order for a user account associated with user 105 in database 150.

At 330, the one or more processors of server 130 or server 200 may transmit order information to a computing device of kiosk 180 in response to a determination that there is the pending remotely placed order for the user account associated with user 105 in database 150. The order information may include one or more items in the pending remotely placed order.

At 340, the one or more processors of server 130 or server 200 may cause assembly of one or more items of the order and a delivery of the one or more items to a kiosk 180. In some embodiments, the one or more processors of server 130 or server 200 may determine that there is not a pending remotely placed order for the user account associated with user 105 in database 150. In these instances, the one or more processors of server 130 or server 200 may determine advertisement information based on user data associated with user 105. The one or more processors of server 130 or server 200 may then transmit the advertisement information to user device 110.

Figure 4:
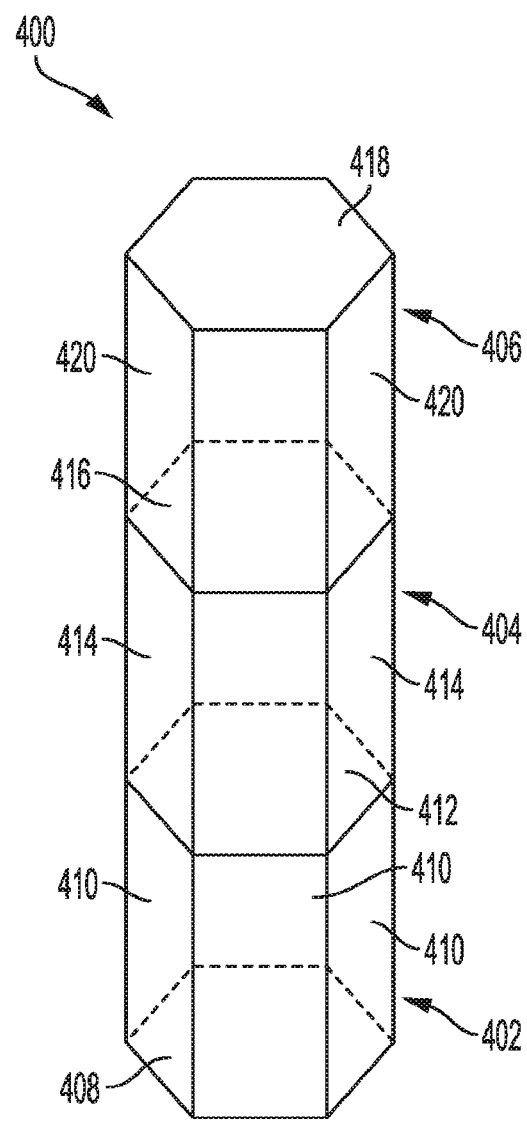
FIG. 4 illustrates a perspective view of an example automated tower according to one example embodiment.

FIG. 4 illustrates an example tower 400 that may implement security systems disclosed herein. As shown in FIG. 4, tower 400 may be a modular tower system for automated pick-up of customer's parcels. Tower 400 may comprise a bottom modular section 402, at least one middle modular section 404, and a top modular section 406. Tower 400 may be installed in a remote location, or inside or outside a retail store. Bottom modular section 402, at least one middle modular section 404, and top modular section 406 can be vertically stacked on top of each other. Such tower configuration may allow capacity of modular tower 400 to be adjustable based on a local market, such that deployment of the modular tower system is more feasible in a remote location, or at a high volume location. Such tower configuration may also allow for peak use and less climate control during off-peak use.

Bottom modular section 402 may be established at a ground level and may be configured to have infrastructure for mounting to a foundation. Bottom modular section 402 may further be configured to have a side circumferential vertical enclosure and a bottom horizontal surface 408 connecting to the side circumferential vertical enclosure. The side circumferential vertical enclosure may have a cross-section of any polygon, and may comprise a plurality of panels 440 corresponding to the sides of the polygonal cross-section. Bottom modular section 402 may also include one or more pick-up or dispensing windows on panels 440. Bottom modular section 402 may further include a crane car and a crane associated with the crane car, a central computer and associated computer networking components, and a power unit.

In some embodiments, Bottom modular section 402 may be made of sturdier materials in order to support the at least one middle modular section 404 and top modular section 406, as well as to provide protection against accidental ground level damages.

In some embodiments, a height of the side circumferential vertical enclosure of bottom modular section 402 may be determined based on heights of the crane car and the crane associated with the crane car, the central computer and associated computer networking components, and the power unit. The height of bottom modular section 402 may also be only as tall as required to contain all the components unique to bottom modular section 402.

In some embodiments, bottom horizontal surface 408 of bottom modular section 402 may be configured to have a standard connection for transferring power and electricity, as well as the infrastructure.

The at least one middle modular section 404 may be configured to have a side circumferential vertical enclosure and a bottom horizontal surface 412 connecting to the side circumferential vertical enclosure of the at least one middle modular section 404. The at least one middle modular section 404 may be vertically and removably stacked atop bottom modular section 402 such that the side circumferential vertical enclosure of the at least one middle modular section 404 can be coordinately and structurally affixed, via the bottom horizontal surface 412 of the at least one middle modular section 404, to the side circumferential vertical enclosure of bottom modular section 402. The at least one middle modular section 404 may include a self-contained mechanical heating, ventilation, and air conditioning (HVAC), one or more doors in bottom horizontal surface 412 sealing around a central column of modular tower system 400 to keep air tight. The at least one middle modular section 404 may also include panels 414 that form the side circumferential vertical enclosure of the at least one middle modular section 404, shelves arranged inside the at least one middle modular section 404, or crane tracks that facilitate movements of the crane.

In some embodiments, the at least one middle modular section 404 may be made of lighter material and can be away from many ground level dangers. In some embodiments, the at least one middle modular section 404 may further include a pick-up window in the side circumferential vertical enclosure for dispensing customer orders.

Top modular section 406 may be configured to have a side circumferential vertical enclosure, a bottom horizontal surface 416 connecting to a bottom surface of the side circumferential vertical enclosure of top modular section 406, and a top horizontal surface 418 connecting to a top surface of the side circumferential vertical enclosure of top modular section 406. The side circumferential vertical enclosure of top modular section 406 may comprise a set of panels 420. Top modular section 406 may be vertically and removably stacked atop the at least one middle modular section 404, such that the side circumferential vertical enclosure of the at least one middle modular section 404 can be coordinately and structurally affixed, via bottom horizontal surface 416 of top modular section 406, to the side circumferential vertical enclosure of top modular section 406. Top modular section 406 may also include a self-contained mechanical HVAC, one or more doors in bottom horizontal surface 416 sealing around the central column of modular tower system 400 to keep air tight. Top modular section 406 may further include shelves arranged inside top modular section 406, or crane tracks that facilitate movements of the crane.

In some embodiments, top horizontal surface 418 of top modular section 406 may be configured to have a standard connection for transferring power and electricity. In some embodiments, top modular section 406 may further include a drone or UAV landing site for package delivery. In some embodiments, top modular section 406 may be formed of lighter structure than bottom modular section 402, as it may only support its own weight, and none above.

In some embodiments, bottom modular section 402, the at least one middle modular section 404, and top modular section 406 may be basic modules that provide ambient-temperature product storage environment. In some embodiments, bottom modular section 402, the at least one middle modular section 404, and top modular section 406 may each include a self-contained mechanical HVAC. A temperature inside each of bottom modular section 402, the at least one middle modular section 404, and top modular section 406 may be one of the following: ambient, cool, or frozen. The HVAC of bottom modular section 402, the at least one middle modular section 404, and top modular section 406 may each entirely be contained within each corresponding modular section, respectively. In addition, bottom modular section 402, the at least one middle modular section 404, and top modular section 406 may be of different vertical heights partially based on each corresponding temperature. Each HVAC may rely on bottom modular section 402 for power and data only, not for the actual refrigeration.

In some embodiments, the at least one middle modular section 404 and top modular section 406 may receive power from the power unit of bottom modular section 402 and may be in communication with the center computer of bottom modular section 402. Power connections between bottom modular section 402 and the at least one middle modular connection 404, and power connections between t top modular section 406 and the at least one middle modular connection 404 may be made by means of male-female plug connections, which can follow a suitable industry standard.

In some embodiments, power may alternatively be provided to each module individually. In this case, power can be provided to an indefinite number of modules, and not limited by the electric current carrying capacity of bottom modular section 402, and the electric current carrying capacity of the wiring between the bottom modular section 402, the at least one middle modular section 404, and the top modular section 406. In these example embodiments, bottom modular section 402, the at least one middle modular connection 404, and top modular section 406, can each receive its respective power independently.

In some embodiments, the crane may be configured to be able to handle all different heights inside tower system 400, for example, by not naming storage slots, but rather by actual geometric locations of customer orders (e.g. 45'2" up, and 45°). By using this method, the crane can identify package locations at any height.

In some embodiments, structural connections between bottom modular section 402 and the at least one middle modular connection 404, and structural connections between top modular section 406 and the at least one middle modular connection 404 may be mechanical connections. The mechanical connections may be standardized, for example, to have interfitting features and secured with fasteners. Bottom modular section 402, the at least one middle modular section 404, and top modular section 406 may be of different heights as needed. For example, a module with a frozen temperature may only need to be 5 feet tall whereas general merchandise may need a module of 45 feet tall.

Each of bottom modular section 402, the at least one middle modular section 404, and top modular section 406 may be a single integral module, or may comprise a plurality of slices, for example, wedge-shaped slices.

An example check-in system may comprise a computing device having an application installed thereon. The computing device may be configured to: check in, via the application, a customer with the automated tower to notify the automated tower of a time range during which an order of the customer is picked up; communicate, via the application, a location of the computing device to the automated tower; and inform, via the application, the automated tower when the customer arrives at the automated tower. For example, a date and a time of the day may be entered as an estimated date/time for pickup of the one or more items of the customer's online order.

As described above, the automated tower may include a central computer in communication with the computing device. The automated tower may be configured to: receive, via the central computer, a check-in message of the customer from the computing device; receive, via the central computer, the location of the computing device; receive, via the central computer, a message indicative of the arrival of the customer at the automated tower, from the computing device; retrieve, via the central computer, information of the order from an order database stored on a remote server; assemble the order based on the check-in message and the information of the order; move the assembled order close to a pick-up location of the automated tower to facilitate pick-up of the assembled order.

In some embodiments, the automated tower may receive the location of the computing device via geographic information about a customer who uses the computing device. For example, the automated tower may receive the geographic information by utilizing a GPS on the computing device. The geographic information may indicate that the customer is within a predetermined area associated with the automated tower. The predetermined area may be determined based on a location of premises or the automated tower. For example, the predetermined area may include premises.

In some embodiments, the geographic information may refer to customer information and behavior that are related to a geographic location of the customer. Geographic location refers to a relative location (e.g., Seattle, 1313 Disneyland Dr, Anaheim, CA 92802, etc.) as a distance for another site or an absolute location using a coordinate system (e.g., a Spherical coordinate system or a world Geodetic system).

In some embodiments, the automated tower may obtain the geographic information in various methods. The customer may provide the geographic information using the computing device. For example, the customer may install an application on the computing device, and the application may monitor user behavior and collect geographic information by utilizing a GPS on the computing device. With the consent of the customer, the application may transmit the collected geographic information to the central computer of the automated tower.

In some embodiments, the geographic information may be obtained by utilizing one or more sensors associated with the automated tower.

The remote server in communication with the central computer may be configured to: store the information of the order in the order database; and send the information of the order to the central computer.

In some embodiments, the automated tower may further be configured to assemble the order based on the information regarding the locations of the order. In some embodiments, the automated tower may further be configured to assemble the order when the location of the computing device is within a predetermined distance from the automated tower. In some embodiments, the automated tower may be further configured to assemble the order when the message indicative of the arrival of the customer at the automated tower is received.

In some embodiments, the automated tower may identify the customer upon arrival at or near the automated tower during the reserved pick-up timeslot. Upon arrival, the customer may be directed by signage, painted arrows on the roadway, or otherwise, to the automated tower.

In some embodiments, the automated tower may be further configured to assemble the order in accordance with the general check-in time when the general check-in time does not interfere with confirmed check-ins from other customers. The check-in time in the time range notified by the computing device may override the general check-in time.

Figure 5:
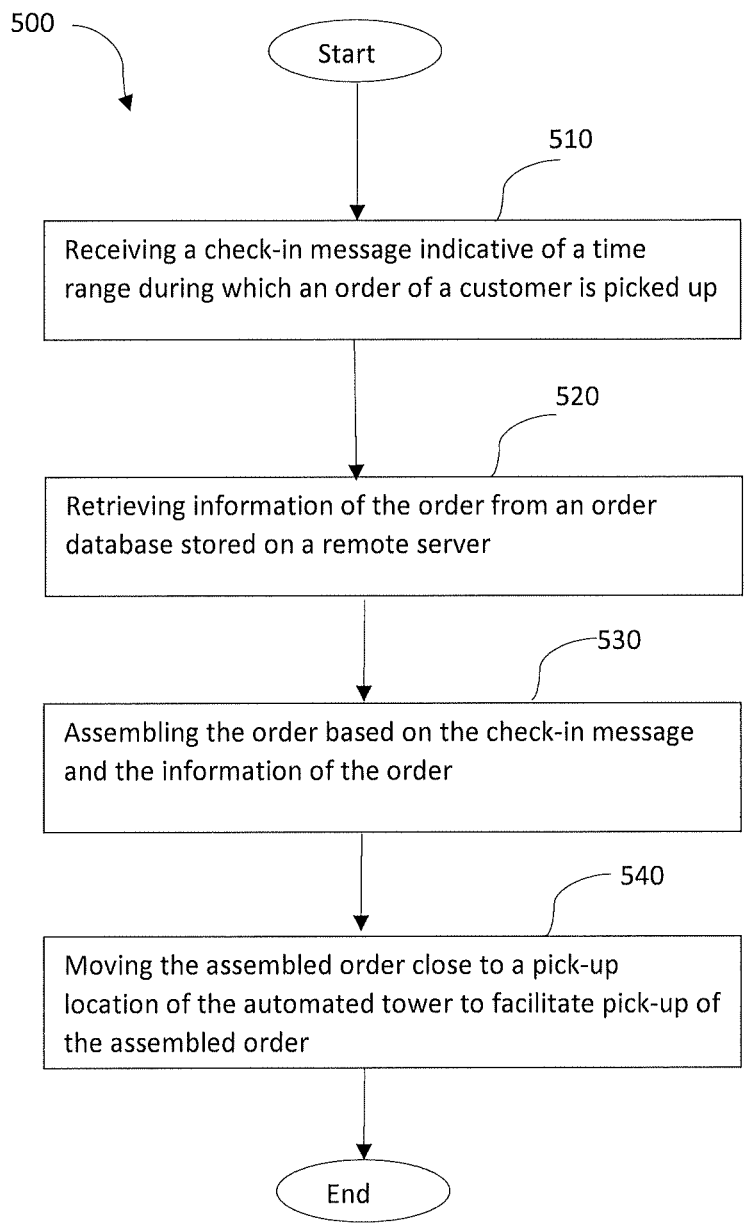
FIG. 5 illustrates a check-in method for preparing customer orders that can be used for the tower in FIG. 4 according to one embodiment.

Methods for check-in may also be provided in this disclosure. FIG. 5 illustrates a check-in method 500 for an automated tower for dispensing a customer's order. The method 500 may be implemented in the above described systems and may include the following steps.

In step 510, a check-in message is received indicative of a time range during which an order of a customer is to be picked up.

In step 520, information of the order is retrieved from an order database.

In step 530, the order is assembled based on the check-in message and the information of the order.

In step 540, the assembled order is moved close to a pick-up location, for example, a window of the tower to facilitate pick-up of the assembled order.

In some embodiments, the method 500 may further include receiving a location of the customer; and assembling the order when the location of customer is within a predetermined distance from the automated tower.

In some embodiments, the method 500 may further include receiving a message indicative of arrival of the customer at the automated tower, and assembling the order when the message indicative of the arrival of the customer at the automated tower is received.

In some embodiments, the method 500 may further include further comprising pre-generating a generic check-in time for picking up the order, based on a plurality of factors, when the order is received by the automated tower.

In some embodiments, if alcohol or any other restricted items are on the order, the automated tower may verify an identification, such as a driver's license.

Figure 6:
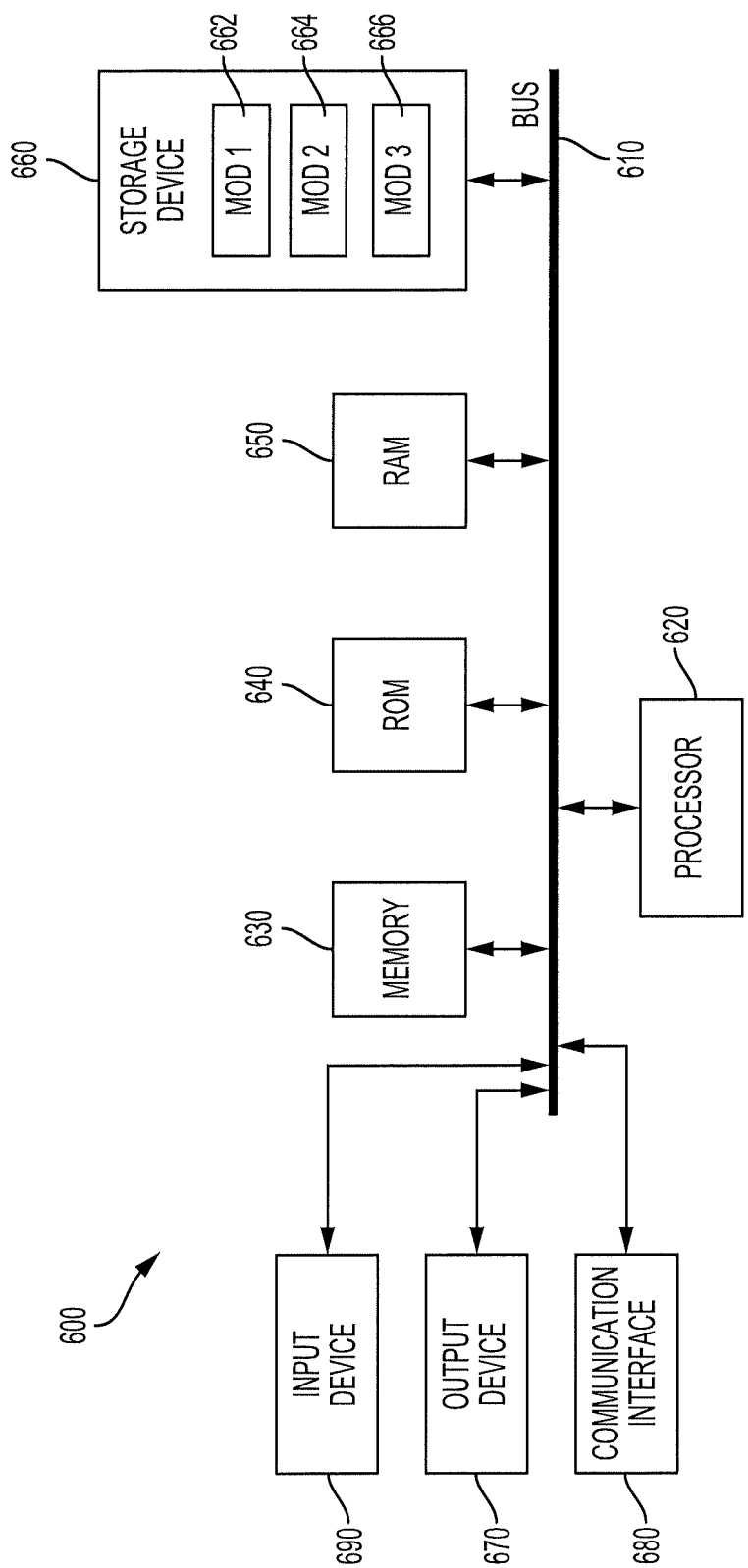
FIG. 6 illustrates an example computer system which can be used to implement the systems and methods to one example embodiment.

FIG. 6 illustrates an example computer system 600 which can be used to perform the systems for inventory monitoring as disclosed herein. The exemplary system 600 can include a processing unit (CPU or processor) 620 and a system bus 610 that couples various system components including the system memory 630 such as read only memory (ROM) 640 and random access memory (RAM) 650 to the processor 620. The system 600 can include a cache of high speed memory connected directly with, in close proximity to, or integrated as part of the processor 620. The system 600 copies data from the memory 630 and/or the storage device 660 to the cache for quick access by the processor 620. In this way, the cache provides a performance boost that avoids processor 620 delays while waiting for data. These and other modules can control or be configured to control the processor 620 to perform various actions. Other system memory 630 may be available for use as well. The memory 630 can include multiple different types of memory with different performance characteristics. It can be appreciated that the disclosure may operate on a computing device 600 with more than one processor 620 or on a group or cluster of computing devices networked together to provide greater processing capability. The processor 620 can include any general purpose processor and a hardware module or software module, such as module 1 662, module 2 664, and module 3 666 stored in storage device 660, configured to control the processor 620 as well as a special-purpose processor where software instructions are incorporated into the actual processor design. The processor 620 may essentially be a completely self-contained computing system, containing multiple cores or processors, a bus, memory controller, cache, etc. A multi-core processor may be symmetric or asymmetric.

The system bus 610 may be any of several types of bus structures including a memory bus or memory controller, a peripheral bus, and a local bus using any of a variety of bus architectures. A basic input/output (BIOS) stored in ROM 640 or the like, may provide the basic routine that helps to transfer information between elements within the computing device 600, such as during start-up. The computing device 600 further includes storage devices 660 such as a hard disk drive, a magnetic disk drive, an optical disk drive, tape drive or the like. The storage device 660 can include software modules 662, 664, 666 for controlling the processor 620. Other hardware or software modules are contemplated. The storage device 660 is connected to the system bus 610 by a drive interface. The drives and the associated computer-readable storage media provide nonvolatile storage of computer-readable instructions, data structures, program modules and other data for the computing device 600. In one aspect, a hardware module that performs a particular function includes the software component stored in a tangible computer-readable storage medium in connection with the necessary hardware components, such as the processor 620, bus 610, display 670, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 600 is a small, handheld computing device, a desktop computer, or a computer server.

Although the exemplary embodiment described herein employs the hard disk 660, other types of computer-readable media which can store data that are accessible by a computer, such as magnetic cassettes, flash memory cards, digital versatile disks, cartridges, random access memories (RAMs) 650, and read only memory (ROM) 640, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 600, an input device 690 represents any number of input mechanisms, such as a microphone for speech, a touch-sensitive screen for gesture or graphical input, keyboard, mouse, motion input, speech and so forth. An output device 670 can also be one or more of a number of output mechanisms known to those of skill in the art. In some instances, multimodal systems enable a user to provide multiple types of input to communicate with the computing device 600. The communications interface 680 generally governs and manages the user input and system output. There is no restriction on operating on any particular hardware arrangement and therefore the basic features here may easily be substituted for improved hardware or firmware arrangements as they are developed.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

What is claimed is:

1. A check-in system for dispensing an order, comprising:
   a non-transitory memory module having instructions stored thereon;
   a database storing order data associated with a plurality of orders, the order data including user data associated with transactions of a user and online preferences of the user;
   a first processor configured to read the instructions to:
      receive, via a transceiver, location data for a user computing device associated with the user;
      determine, based on the location data, that the user computing device is within a predetermined distance of a physical location;
      in response to determining the user computing device is within the predetermined distance, obtain, from the database, order data for at least one order associated with the user computing device; and
      receive a check-in message from the user computing device; and
   a modular stackable kiosk comprising a second processor configured to:
      receive the order data from the first processor, wherein the order data is provided to the kiosk in response to obtaining the order data from the database;
      determine there is adequate space for an assembled order corresponding to the order data at the kiosk, the assembled order including one or more items that includes a non-ambient temperature item;
      determine an estimated time of arrival of the user based at least in part on the location data of the user computing device;
      determine a change in temperature for the non-ambient temperature item based on the estimated time of arrival;
      determine a pick-up temperature range for the non-ambient temperature item based on the change in temperature, the pick-up temperature range including a maximum temperature above a storage temperature of the non-ambient temperature item;
      determine an earliest assembly time such that the non-ambient temperature item will be within the pick-up temperature range at the estimated time of arrival;
      in response to determining there is adequate space and determining the earliest assembly time, implement a set of operations that automatically assemble the non-ambient temperature item at or after the earliest assembly time; and
      in response to the first processor receiving the check-in message from the user computing device, dispense the assembled order.

2. The check-in system of claim 1, wherein the assembled order is stored in a first location, and wherein the second processor is configured to:
   in response to the first processor receiving the check-in message from the user computing device, implement an additional set of operations that automatically transfer the assembled order the first location to a dispensing location prior to dispensing the assembled order.

3. The check-in system of claim 1, wherein the second processor is configured to:
   determine a first item of the one or more items identified by the order is not available;
   obtain user preference data;
   select a substitute item for the first item based on the user preference data; and
   assemble the one or more items including the substitute item.

4. The check-in system of claim 1, wherein the location data comprises an absolute location using a coordinate system.

5. The check-in system of claim 1, wherein the location data is received from the user computing device.

6. The check-in system of claim 1, wherein the second processor is configured to implement the set of operations that automatically assemble one or more items identified by the order data when the location data indicates the user computing device is within a second predetermined distance of the physical location.

7. The check-in system of claim 1, wherein the kiosk is located within a structure.

8. The check-in system of claim 1, wherein the change in temperature is an increase in temperature above a storage temperature of the non-ambient temperature item.

9. The check-in system of claim 1, wherein the non-ambient temperature item begins to degrade above the maximum temperature.

10. A computer-implemented method, comprising:
    receiving, via a transceiver, location data for a user computing device associated with a user;
    determining, based on the location data, that the user computing device is within a predetermined distance of a physical location;
    in response to determining the user computing device is within the predetermined distance, obtaining, from a database, order data for at least one order associated with the user computing device, the order data including user data associated with transactions of the user and online preferences of the user; and
    receiving a check-in message from the user computing device;
    determining there is adequate space within a modular stackable kiosk for an assembled order corresponding to the order data, the assembled order including one or more items that includes a non-ambient temperature item;

determining an estimated time of arrival of the user based at least in part on the location data of the user computing device;

determining a change in temperature for the non-ambient temperature item based on the estimated time of arrival;

determining a pick-up temperature range for the non-ambient temperature item based on the change in temperature, the pick-up temperature range including a maximum temperature above a storage temperature of the non-ambient temperature item;

determining an earliest assembly time such that the non-ambient temperature item will be within the pick-up temperature range at the estimated time of arrival;

in response to determining there is adequate space and determining the earliest assembly time, implementing a set of operations that automatically assemble the non-ambient temperature item at or after the earliest assembly time; and in response to receiving the check-in message from the user computing device, dispensing the assembled order.

11. The computer-implemented method of claim 10, wherein the assembled order is stored in a first location, the method further comprising in response receiving the check-in message from the user computing device, implement an additional set of operations that automatically transfer the assembled order from the first location to a dispensing location prior to dispensing the assembled order.

12. The computer-implemented method of claim 10, comprising:

determining a first item of the one or more items identified by the order is not available;

obtaining user preference data;

selecting a substitute item for the first item based on the user preference data; and assembling the one or more items including the substitute item.

13. The computer-implemented method of claim 10, wherein the location data comprises an absolute location using a coordinate system.

14. The computer-implemented method of claim 10, wherein the location data is received from the user computing device.

15. The computer-implemented method of claim 10, comprising implementing the set of operations that automatically assemble one or more items identified by the order data when the location data indicates the user computing device is within a second predetermined distance of the physical location.

16. The computer-implemented method of claim 10, wherein the change in temperature is an increase in temperature above a storage temperature of the non-ambient temperature item.

17. The computer-implemented method of claim 10, wherein the non-ambient temperature item begins to degrade above the maximum temperature.

18. A non-transitory computer-readable medium having instructions stored thereon that, when executed by a processor, cause a computing device to perform steps comprising:

receiving, via a transceiver, location data for a user computing device associated with a user;

determining, based on the location data, that the user computing device is within a predetermined distance of a physical location;

in response to determining the user computing device is within the predetermined distance, obtaining, from a database, order data for at least one order associated with the user computing device, the order data including user data associated with transactions of the user and online preferences of the user; and receiving a check-in message from the user computing device;

determining there is adequate space within a modular stackable kiosk for an assembled order corresponding to the order data, the assembled order including one or more items that includes a non-ambient temperature item;

determining an estimated time of arrival of the user based at least in part on the location data of the user computing device;

determining a change in temperature for the non-ambient temperature item based on the estimated time of arrival;

determining a pick-up temperature range for the non-ambient temperature item based on the change in temperature, the pick-up temperature range including a maximum temperature above a storage temperature of the non-ambient temperature item;

determining an earliest assembly time such that the non-ambient temperature item will be within the pick-up temperature range at the estimated time of arrival;

in response to determining there is adequate space and determining the earliest assembly time, implementing a set of operations that automatically assemble the non-ambient temperature item at or after the earliest assembly time; and in response to receiving the check-in message from the user computing device, dispensing the assembled order.

19. The non-transitory computer-readable medium of claim 18, wherein the change in temperature is an increase in temperature above a storage temperature of the non-ambient temperature item.

20. The non-transitory computer-readable medium of claim 18, wherein the non-ambient temperature item begins to degrade above the maximum temperature.

* * * * *